(12) United States Patent
Sato

(10) Patent No.: US 7,901,572 B2
(45) Date of Patent: Mar. 8, 2011

(54) FUEL FILTER APPARATUS

(75) Inventor: Hiroji Sato, Tokyo (JP)

(73) Assignee: NIFCO Inc., Yokohama-Shi, Kanagawa (JP)

( * ) Notice: Subject to any disclaimer, the term of this patent is extended or adjusted under 35 U.S.C. 154(b) by 0 days.

(21) Appl. No.: 12/451,056

(22) PCT Filed: Apr. 25, 2008

(86) PCT No.: PCT/JP2008/058075
§ 371 (c)(1),
(2), (4) Date: Nov. 30, 2009

(87) PCT Pub. No.: WO2008/133328
PCT Pub. Date: Nov. 6, 2008

(65) Prior Publication Data
US 2010/0072120 A1    Mar. 25, 2010

(30) Foreign Application Priority Data
Apr. 26, 2007    (JP) .................................. 2007-117566

(51) Int. Cl.
*B01D 29/13* (2006.01)
*B01D 29/15* (2006.01)
*B01D 35/02* (2006.01)
*F02M 37/22* (2006.01)

(52) U.S. Cl. .................. 210/172.4; 210/416.4; 210/489; 210/483

(58) Field of Classification Search .......................... None
See application file for complete search history.

(56) References Cited

U.S. PATENT DOCUMENTS

| 5,902,480 | A  | * | 5/1999  | Chilton et al. ................ 210/317 |
| 7,029,582 | B2 | * | 4/2006  | Sato et al. ..................... 210/232 |
| 7,134,568 | B2 | * | 11/2006 | Moriyama et al. ............ 220/563 |
| 7,429,322 | B2 | * | 9/2008  | Fujita et al. ................ 210/172.2 |
| 2004/0222143 | A1 | * | 11/2004 | Kojima et al. ............. 210/416.4 |
| 2004/0251194 | A1 | * | 12/2004 | Brzozowski et al. ....... 210/416.4 |
| 2005/0006300 | A1 | * | 1/2005  | Sato et al. .................. 210/416.4 |
| 2005/0023201 | A1 | * | 2/2005  | Sato ............................. 210/172 |
| 2005/0061723 | A1 | * | 3/2005  | Matsushita .................. 210/171 |
| 2005/0109685 | A1 | * | 5/2005  | Fujita et al. ................ 210/172 |
| 2005/0150826 | A1 | * | 7/2005  | Sato et al. .................... 210/488 |

(Continued)

FOREIGN PATENT DOCUMENTS
DE    199 05 969    8/2000

(Continued)

OTHER PUBLICATIONS
Translation of IPER of Nov. 10, 2009—5 Pages.*

Primary Examiner — Robert James Popovics
(74) Attorney, Agent, or Firm — Manabu Kanesaka

(57) ABSTRACT

A filter apparatus F includes a bag-shape filter body and is attached in such a manner that an internal space of the filter body is connected to a fuel inlet in a fuel tank. The filter body includes two or more filter materials laminated each other. At least one of the filter materials is formed of an unwoven cloth having an average aperture diameter of 30 μm or less. A filter material made of an unwoven cloth having a maximum aperture diameter of 100 μm or less is disposed outside of the filter material made of the unwoven cloth having the average aperture diameter of 30 μm or less.

6 Claims, 3 Drawing Sheets

U.S. PATENT DOCUMENTS

| | | |
|---|---|---|
| 2006/0266693 A1 | 11/2006 | Yoshida et al. |
| 2007/0246420 A1* | 10/2007 | Sato ............................ 210/416.4 |
| 2008/0185331 A1* | 8/2008 | Sato et al. ...................... 210/435 |
| 2009/0120858 A1* | 5/2009 | Kojima et al. ............ 210/167.08 |
| 2009/0321347 A1* | 12/2009 | Ogose ............................ 210/452 |
| 2010/0072120 A1* | 3/2010 | Sato ............................ 210/172.4 |
| 2010/0206802 A1* | 8/2010 | Sato et al. ...................... 210/490 |

FOREIGN PATENT DOCUMENTS

| | | | |
|---|---|---|---|
| EP | 1495789 A1 * | 1/2005 | |
| EP | 1 502 637 | 2/2005 | |
| EP | 1502637 A1 * | 2/2005 | |
| EP | 1 726 347 | 11/2006 | |
| EP | 1792644 A1 * | 6/2007 | |
| FR | 2 790 518 | 9/2000 | |
| GB | 2 347 876 | 9/2000 | |
| JP | 09105366 A * | 4/1997 | |
| JP | 2000-246026 | 9/2000 | |
| JP | 2005-048721 | 2/2005 | |
| JP | 2005-152769 | 6/2005 | |
| JP | 2006-326515 | 12/2006 | |

* cited by examiner

FUEL FILTER APPARATUS

FIELD OF TECHNOLOGY

This invention relates to an improvement of a fuel filter apparatus used by being attached to a fuel suction opening in a fuel tank.

BACKGROUND ART

Fuel in a fuel tank is sent to an internal combustion engine through a suction pipe and so on disposed in this fuel tank. A filter apparatus is attached to a fuel suction opening of such a suction pipe in order to remove water from the fuel thus sent and to prevent dust from being sent into a fuel pump. As such a filter apparatus, there is one shown in Patent Document 1 disclosed by the present applicant.

Inside the filter apparatus of Patent Document 1, there is a bag-like filter body having an internal space which is connected to the fuel suction opening inside the fuel tank. Such filter body has three layers of filter materials made of an unwoven cloth produced by melt-blown method between the outermost filter material made of a woven fabric mesh and the innermost filter material made of an unwoven cloth produced by spun-bond method. Also, it is made such that an average aperture diameter of the unwoven cloth produced by melt-blown method positioned on the inside becomes smaller than an average aperture diameter of the unwoven cloth produced by the melt-blown method positioned on the outside, whereby a filtration gradient is given to the filter body. In this way, while it is made such that fine dust can be captured, the burden on the filter material made of the unwoven cloth produced by the melt-blown method positioned on the inside having a small average aperture diameter is reduced so as to achieve a long life of the filter apparatus. Also, generally, a secondary filter for capturing additional fine dust is provided on the downstream side of the fuel pump. However, in the case that the filter apparatus of Patent Document 1 is used, such secondary filter can be eliminated.

Here, generally, it is said that dust mixed inside the fuel tank corresponds to JIS test powder 1 (JIS Z 8901) including seven kinds. (Hereinafter, called JIS 7) In this JIS 7 powder, approximately 90% of a total thereof is constituted by particles having a particle diameter of 30 µm or less. (See Table 1/the number of particles in 10 milliliters of 200 milliliters of a test liquid wherein 60 mg of the JIS 7 powders are mixed, was measured.)

TABLE 1

| Particle Diameter: | Number of Particles | |
|---|---|---|
| Unit µm | Cumulative Number | Relative Ratio |
| 5 or more | 251794 | 100.0% |
| 10 or more | 187868 | 74.6% |
| 20 or more | 82788 | 32.9% |
| 30 or more | 32061 | 12.7% |
| 40 or more | 13403 | 5.3% |
| 50 or more | 5298 | 2.1% |
| 70 or more | 330 | 0.1% |
| 100 or more | 4 | 0.0% |

(Measured by a particle counter)

Patent Document 1: Japanese Unexamined Patent Application

DISCLOSURE OF THE INVENTION

Problems to be Solved by the Invention

The main subject which this invention attempts to solve is to make it possible to constitute a filter body comprising this kind of filter apparatus so as to be further suitable for eliminating dust corresponding to JIS 7 powder.

Means for Solving the Problems

In order to solve said problem, in the first aspect of this invention, a fuel filter apparatus is made as a filter apparatus having a bag-like filter body and being attached in a manner such that an internal space of this filter body is connected through to a fuel suction opening inside a fuel tank, the filter body is constituted such that two or more filter materials are overlapped, at least one of the filter materials is made of an unwoven cloth having an average aperture diameter of 30 µm or less, and the filter material made of an unwoven cloth having a maximum aperture diameter of 100 µm or less is disposed on the outside of the filter material made of the unwoven cloth having the average aperture diameter of 30 µm or less.

According to such structure, firstly, by the filter material made of the unwoven cloth having the average aperture diameter of 30 µm or less, dust having a particle diameter of 30 µm or less which accounts for approximately 90% of a total of JIS 7 powder, can be adequately removed from the fuel sucked from the fuel suction opening. Also, secondly, by the filter material made of the unwoven cloth having a maximum aperture diameter of 100 µm or more which is disposed on the outside of the filter material made of the unwoven cloth having the average aperture diameter of 30 µm or less, it is possible to prevent clogging (i.e., decrease of an effective filtration area) of the filter material made of the unwoven cloth having the average aperture diameter of 30 µm or less due to relatively large dust. Also, while keeping the loss of a pressure constant over a long period of time, the dust having the particle diameter of 30 µm or less which accounts for approximately 90% of the total of the JIS 7 powder can be adequately removed from the fuel sucked from the fuel suction opening. Also, thirdly, since these filter materials are made of the unwoven cloths, there is a difference between a maximum aperture diameter and a minimum aperture diameter. Moreover, since the dust is captured in the thickness of the filter material which differs from a filter material made of a woven mesh, clogging of the filter body tends not to occur, so that it is easy to keep the loss of the pressure constant over time, and the burden on a fuel pump can be minimized for a long period of time.

Also, in order to solve said problem, in the second aspect of this invention, the fuel filter apparatus is made as the filter apparatus having the bag-like filter body and being attached in such a manner that the internal space of this filter body is connected through to the fuel suction opening inside the fuel tank, the filter body is constituted such that two or more filter materials with different average aperture diameters are overlapped, and a range of the aperture diameter constituting the aperture area which accounts for 10% by accumulating from a maximum aperture of a total aperture area of a filter material A made of one unwoven cloth among the filter materials; and a range of the aperture diameter constituting the aperture area which accounts for 10% of the total aperture area of a filter material B made of an unwoven cloths having the largest average aperture diameter next to that of the filter material A, and also disposed on the outside of the filter material A, are approximately overlapped.

Also, in order to solve said problem, in the third aspect of this invention, the fuel filter apparatus is made as the filter apparatus having the bag-like filter body and being attached in such a manner that the internal space of this filter body is connected through to the fuel suction opening inside the fuel tank, the filter body is constituted such that two or more filter materials having different average aperture diameters are overlapped, and within the range of the aperture diameter constituting the aperture area which accounts for 10% of the total aperture area accumulating from the largest aperture of the filter material A made of one unwoven cloth among these filter materials, a largest aperture within the range of the aperture diameter constituting the aperture area which accounts for 10% of the total aperture area accumulating from the smallest aperture of the filter material B made of one of the other unwoven cloths having the largest average aperture diameter next to that of the filter material A and disposed on the outside of the filter material A, is positioned.

According to the second and third aspects of this invention, firstly, overlap of a range of a particle diameter of the dust captured by the filter material A and a range of the particle diameter of the dust captured by the filter material B disposed on the outside of the filter material A can be minimized. Also, while leaving an effective filtration area of the filter material A, it is possible to prevent a condition which increases the loss of a pressure due to the decrease of the effective filtration area of the filter material B from occurring as much as possible. Also, secondly, by laminated a part of the range of the particle diameter of the dust captured by the filter material A and the range of the particle diameter of the dust captured by the filter material B disposed on the outside of the filter material A, the burden of the filter material A disposed on the further inner side can be minimized.

Also, in the filter apparatus, with respect to the loss of a pressure of the filter body after 200 mg of the powder per 1 $cm^2$ of the filter body are captured from the fuel in which JIS 7 test powder 1 (JIS Z 8901) is mixed, it is said to be ideal that the loss of the pressure be 9.8 kPa or less per 1 $cm^2$ of the filter body when the flow rate of the fuel is 1.6 liters/h per 1 $cm^2$ of the filter body.

EFFECT OF THE INVENTION

According to such filter apparatus of this invention, it is possible to adequately remove the dust corresponding to JIS 7 powder from the fuel sent to an internal combustion side, and also be used for filtration of the fuel over a long period of time within a range of the loss of the pressure which practically does not overburden a fuel pump in a condition such that clogging due to the dust corresponding to the JIS 7 powder tends not to occur. Also, generally, a secondary filter is provided on the downstream side of a fuel pump for capturing further fine dust. However, in the case of using such filter apparatus, it is possible to eliminate such secondary filter.

BEST MODES OF CARRYING OUT THE INVENTION

Hereinafter, one of the preferred examples of this invention is explained based on FIG. 1 and FIG. 2.

Figure 1:
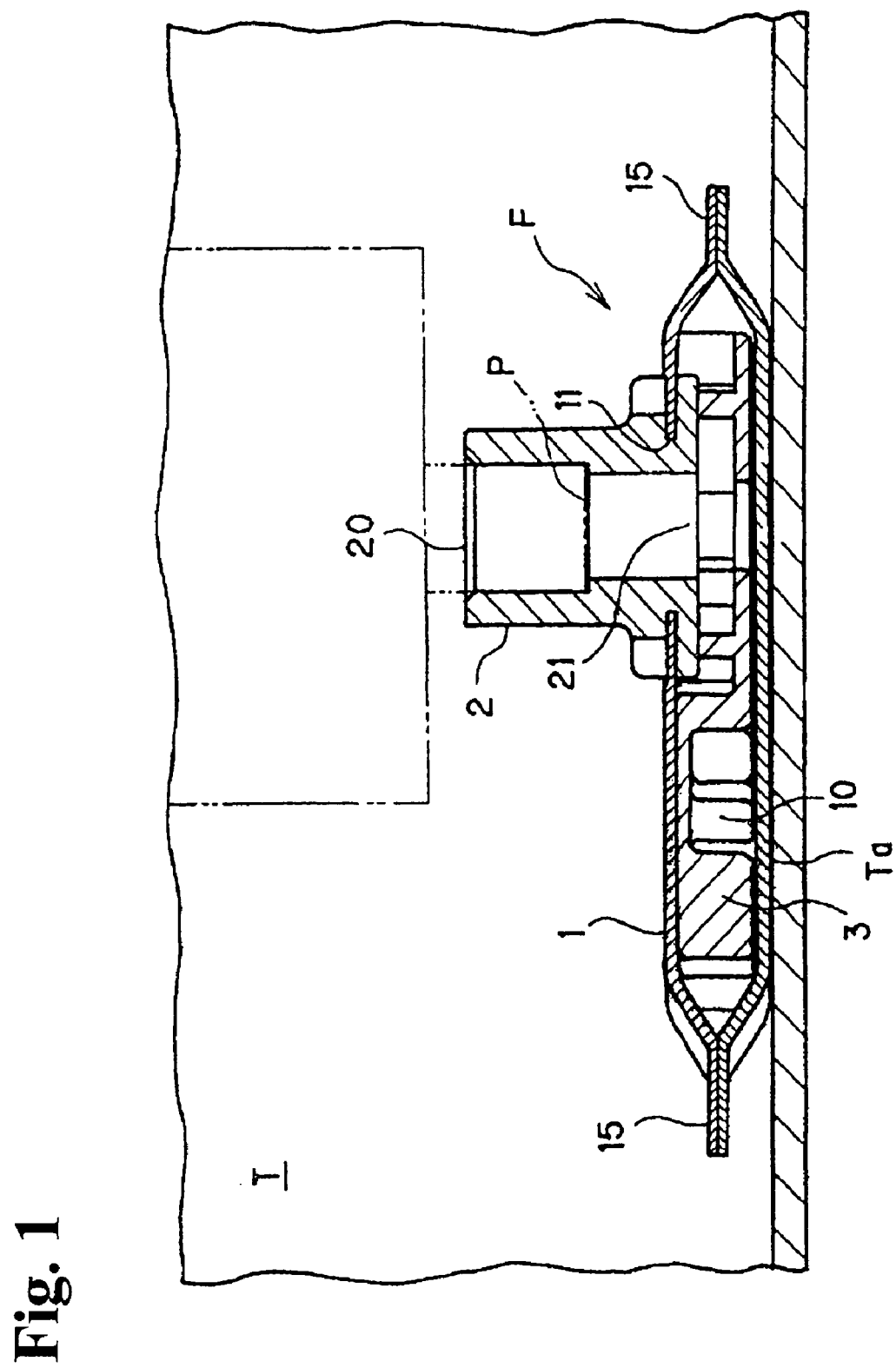
FIG. 1 is a sectional structural view showing the condition of a filter apparatus in use.
Figure 2:
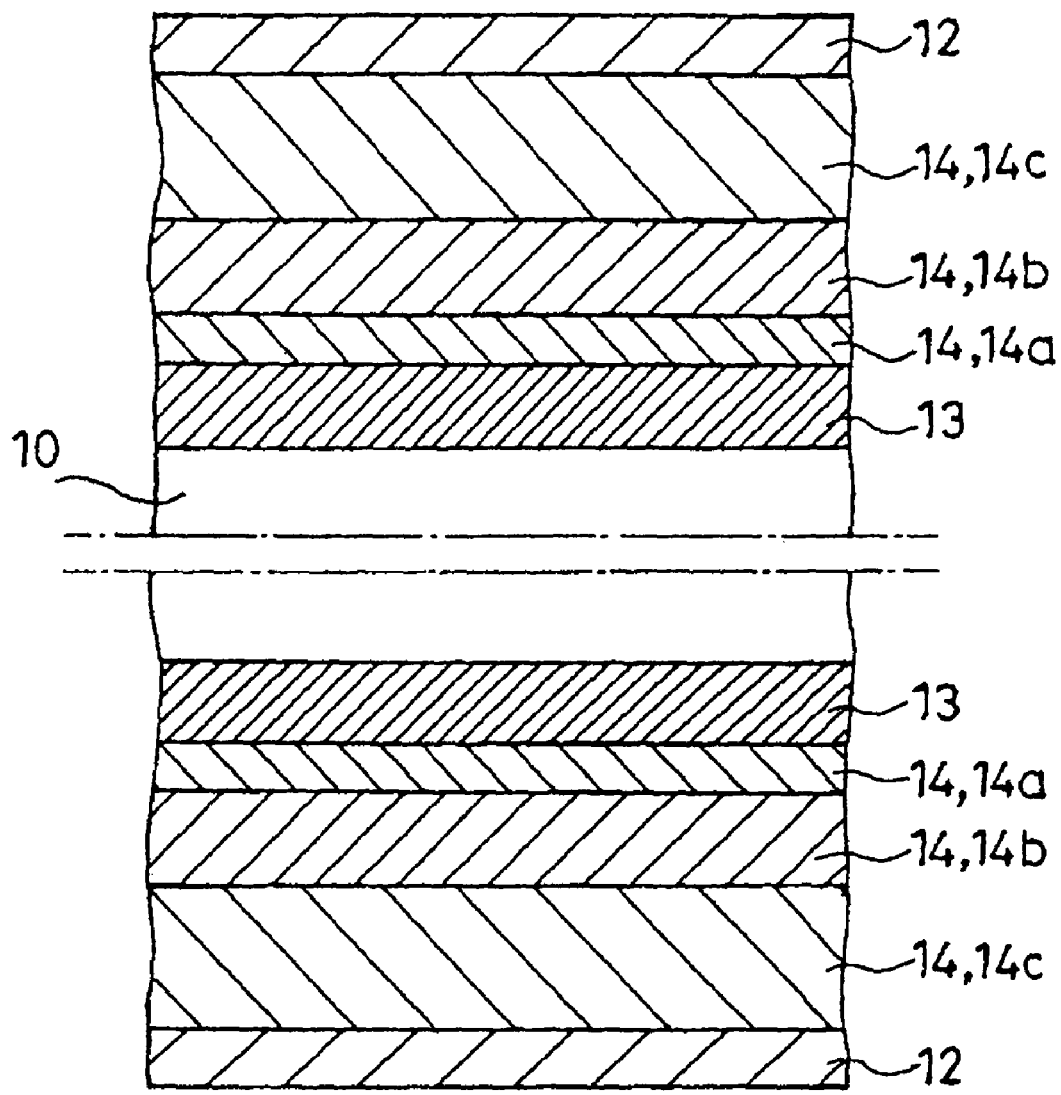
FIG. 2 is an enlarged sectional structural view showing a configuration example of a filter body.

Incidentally, FIG. 1 is a structural view showing the condition in which a filter apparatus F is attached to a fuel suction opening P inside a fuel tank T; also, FIG. 2 shows one example of the cross sectional structure of a filter body 1 constituting such filter apparatus F. (In FIG. 2, only the cross sectional structure on the upper face side and the lower face side of the filter body 1 is represented, and a space forming member 3 held inside the filter body 1 is omitted.)

The fuel filter apparatus F pertaining to the example is attached to the fuel suction opening P inside the fuel tank T of an automobile or motorcycle, or the like, so that water and foreign material do not exit in the fuel sent to an internal combustion engine side via such fuel suction opening P.

Typically, such filter apparatus F is attached to the fuel suction opening P on a suction pipe having the fuel suction opening P inside the fuel tank T.

Also, sending of fuel to the internal combustion engine side via such fuel suction opening P is accomplished by a fuel pump disposed inside the fuel tank T or a fuel tank disposed outside the fuel tank T.

Such filter apparatus F has a bag-like filter body 1. Also, such filter apparatus F is attached to the fuel suction opening P in a manner such that an internal space 10 of this bag-like filter body 1 is connected through to said fuel suction opening P.

Concretely, in the illustrated example, said filter apparatus F has a plastic cylindrical socket body 2 having one end part 20 as an end part for connection to said fuel suction opening P and an other end part 21 as an end part for connection to a connect-through hole 11 formed on said filter body 1, and it is made such that the internal space 10 of the filter body 1 is connected through to the fuel suction opening P by this cylindrical socket body 2.

Also, in the illustrated example, such filter apparatus F has a space forming member 3 which is held inside said filter body 1 and always keeps this filter body 1 in an inflated bag-like form.

Concretely, in the illustrated example, said space forming member 3 is constituted so as to have a thickness such that its upper face contacts the inner face of the upper part of the bag-like filter body 1 and its lower face contacts the inner face of the lower part of this filter body 1, and it is inserted inside the filter body 1 in a manner such that it always keeps this filter body 1 in an inflated bag-like form. On this space forming member 3, there are formed plural fuel passage parts (not illustrated) spanning between its upper face and lower face.

Also, said filter body 1 is constituted by overlaying two or more filter materials 12 to 14.

In addition, at least one of these filter materials 12 to 14 is the filter material 14a (or 14b, or 14a and 14b) made of an unwoven cloth having an average aperture diameter of 30 μm or less, and a filter material 14c made of an unwoven cloth having a maximum aperture diameter of 100 μm or more, is disposed on the outside (upstream side of the flow of fuel, i.e., a primary side) of the filter material 14a (or 14b, or 14a and 14b) made of the unwoven cloth having the average aperture diameter of 30 μm or less.

In the illustrated example in FIG. 2, an outermost layer of the filter body 1 is made by the filter material 12 made of a woven fabric mesh, and an innermost layer of the filter body 1 is made by the filter material 13 made of an unwoven cloth formed by spun-bond method. Also, three sheets of filter materials 14 made of an unwoven cloth formed by melt-blown method are overlapped and sandwiched between the filter materials 12, 13.

In the case of the illustrated example in FIG. 2, among the three sheets of filter materials 14 made of the unwoven cloth formed by melt-blown method, the average aperture diameter of the filter material 14a positioned on the innermost side has 30 μm or less; the average aperture diameter of the filter material 14b positioned between the filter material 14a positioned on the innermost side and the filter material 14c positioned on the outermost side has 30 μm or less; or the average aperture diameter of the filter material 14a positioned on the innermost side has 30 μm or less, and also the average aperture diameter of the filter material 14b positioned between the filter material 14a positioned on the innermost side and the filter material 14c positioned on the outermost side has 30 μm or less. Then, the average aperture diameter of the filter material 14c positioned on the outermost side is made in a range of 30 μm or more, and smaller than the average aperture diameter of the filter material 12 of the outermost layer made of the woven fabric mesh. Also, a maximum aperture diameter of the filter material 14c positioned on the outermost side has 100 μm or more.

By structuring the filter body 1 as mentioned above, firstly, it is possible to adequately remove the dust having a particle diameter of 30 μm or less which accounts for approximately 90% of the total of the JIS 7 powder from the fuel sucked from the fuel suction opening P by the filter material 14a (or 14b, or 14a and 14b) made of the unwoven cloth having the average aperture diameter of 30 μm or less. Also, secondly, by the filter material 14c made of the unwoven cloth having a maximum aperture diameter of 100 μm or more which is disposed on the outside of the filter material 14a (or 14b, or 14a and 14b) made of the unwoven cloth having the average aperture diameter of 30 μm or less, it is possible to prevent clogging (i.e., decrease of an effective filtration area) of the filter material 14a (or 14b, or 14a and 14b) made of the unwoven cloth having the average aperture diameter of 30 μm or less due to relatively large dust. Also, while keeping the loss of a pressure constant over a long period of time, the dust having the particle diameter of 30 μm or less which accounts for approximately 90% of the total of the JIS 7 powder can be adequately removed from the fuel sucked from the fuel suction opening P. Also, thirdly, since these filter materials 14 are made of the unwoven cloth, there is a difference between a maximum aperture diameter and a minimum aperture diameter. Moreover, since the dust is captured in the thickness of the filter materials 14 which differ from the filter material 12 made of the woven mesh, clogging of the filter body 1 tends not to occur, so that it is easy to keep the loss of the pressure constant over time, and the burden on the fuel pump can be minimized for a long period of time.

Also, in this example, a range of the aperture diameter constituting the aperture area which accounts for 10% of a total aperture area accumulating from a maximum aperture of the filter material A made of one unwoven cloth among said at least two filter materials 12 to 14; and a range of the aperture diameter constituting the aperture area which accounts for 10% of a total aperture area of the filter material B made of one of the other unwoven cloths having the largest average aperture diameter next to that of the filter material A, and also disposed on the outside of the filter material A, are approximately overlapped.

Also, within a range of the aperture diameter constituting the aperture area which accounts for 10% of the total aperture area accumulating from a maximum aperture of the filter material A made of one unwoven cloth among these filter materials 12 to 14, a maximum aperture within a range of the aperture diameter constituting the aperture area which accounts for 10% of the total aperture area accumulating from a minimum aperture of the filter material B made of one of the other unwoven cloths having the largest average aperture diameter next to that of the filter material A, and also disposed on the outside of the filter material A, is positioned.

By such structure of the filter body 1, firstly, overlap of a range of a particle diameter of the dust captured by the filter material A and a range of the particle diameter of the dust captured by the filter material B disposed on the outside of the filter material A can be minimized. Also, while leaving an effective filtration area of the filter material A, it is possible to prevent a condition which increases the loss of a pressure due to the decrease of the effective filtration area of the filter material B from occurring as much as possible. Also, secondly, by laminated a part of the range of the particle diameter of the dust captured by the filter material A and the range of the particle diameter of the dust captured by the filter material B disposed on the outside of the filter material A, the burden of the filter material A disposed on the further inner side can be minimized.

In the illustrated example in FIG. 2, such filter body 1 is constituted, for example, as follows.

The outermost layer (filter material 12): woven fabric mesh/aperture diameter 289 μm, thickness 0.32 mm The second layer (filter material 14c) (one layer inner side of the outermost layer): unwoven cloth by melt-blown method/average aperture diameter 86.2 μm, maximum aperture diameter 162.2 μm, thickness 0.82 mm The third layer (filter material 14b) (further inner side of the second layer): unwoven cloth by melt-blown method/average aperture diameter 21.7 μm, maximum aperture diameter 52.3 μm, thickness 0.52 mm.

The fourth layer (filter material 14a) (further inner side of the third layer): unwoven cloth by melt-blown method/average aperture diameter 6.2 μm, maximum aperture diameter 14.3 μm, thickness 0.28 mm The innermost layer (filter material 13): unwoven cloth by spun-bond method/average aperture diameter 39.7 μm, maximum aperture diameter 95 μm, thickness 0.46 mm Also, such filter body 1 is constituted in such a way that the percentage (cumulative relative area ratio) of, for example, a specific aperture diameter of a total aperture area of said second layer to fourth layer is shown as follows. (In the following table 1, solid lines represent the percentage of the fourth layer; chain lines represent the percentage of the third layer; and dotted lines represent the percentage of the second layer.)

In the case that the fourth layer is made by said filter material A, the third layer becomes said filter material B. The range of the aperture diameter, constituting the aperture area which accounts for 10% of the total aperture area accumulating from a maximum aperture of the fourth layer, accounts for approximately 10% of the total aperture area of the third layer. (Between line segments n1 and n2 in Table 1) In the case that the third layer is made by said filter material A, the second layer becomes said filter material B. The range of the aperture diameter, constituting the aperture area which accounts for 10% of the total aperture area accumulating from a maximum aperture of the third layer, accounts for approximately 10% of the total aperture area of the second layer. (Between line segments n3 and n4 in Table 1) In the case that the fourth layer is made by said filter material A; the third layer is made by said filter material B; and the second layer is made by a filter material C, there are a relationship which occurs in the case that the filter material A and the filter material B are compared, and also a relationship which occurs in the case that the filter material B and the filter material C are compared.

Figure 3:
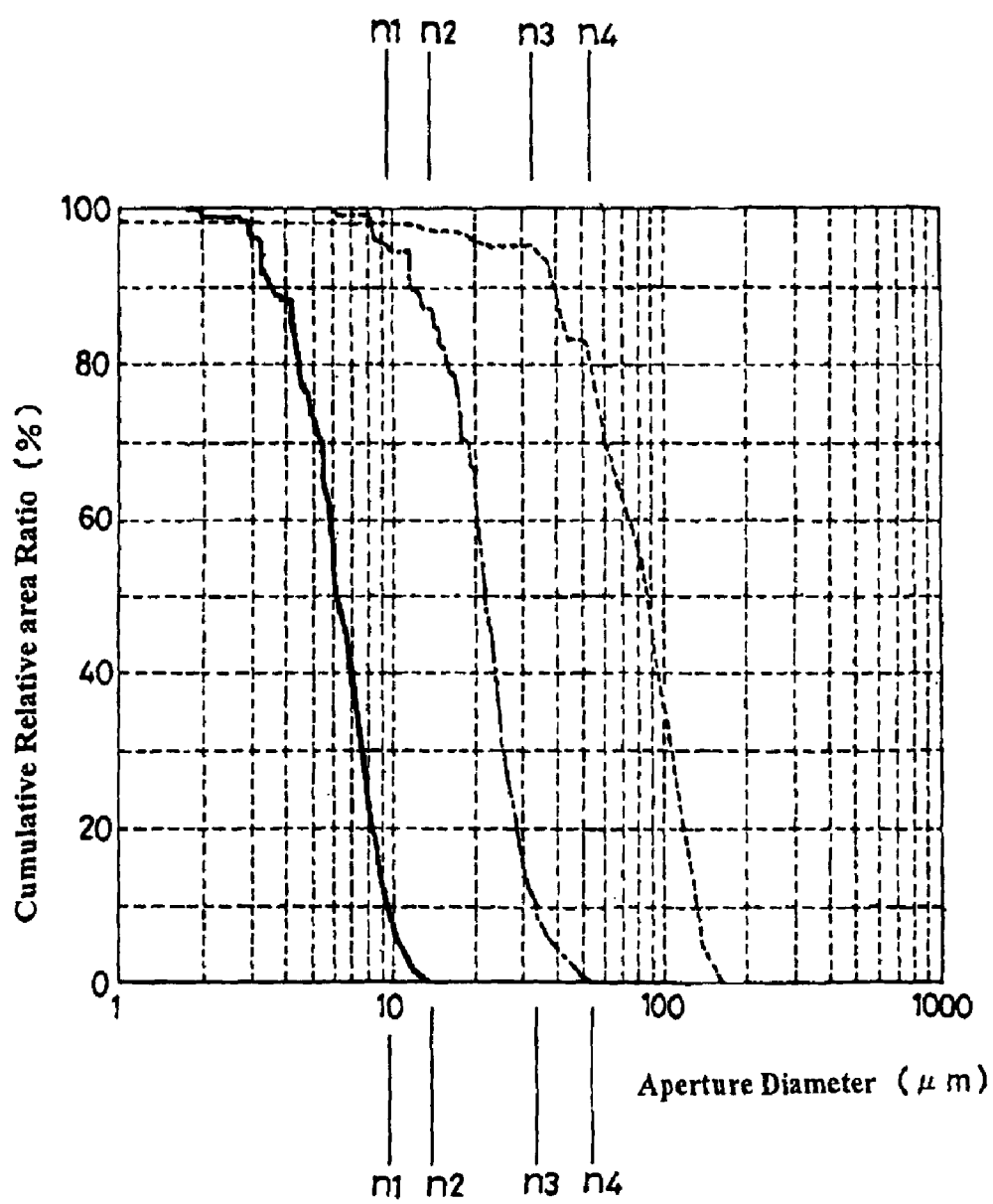
FIG. 3 is a table constituting the filter body including the second to fourth layers, with respect to the loss of a pressure of the filter body.

In the filter body 1 including the second to fourth layers constituted as the FIG. 3, with respect to the loss of a pressure of the filter body after 200 mg of the powder per 1 cm² of the filter body is captured from the fuel in which the JIS 7 test powder 1 (JIS Z 8901) is mixed, when the flow rate of the fuel is 1.6 liters/h per 1 cm² of the filter body, the loss of the pressure was 7.8 kPa per 1 cm² of the filter body.

Also, in this embodiment, the filter material positioned on the innermost side of the filter body 1 is made as the filter material 13 formed by spun-bond method. In this case, the filter body 1 is given rigidity (stiffness) by the filter material 13 formed by such spun-bond method, so that it can be made easy to maintain the shape of the filter body 1. Also, without contacting the filter material 14 formed by melt-blown method with said space forming member 3, the filter material 13 formed by spun-bond method with higher rigidity than the filter material 14 can be contacted with said space forming member 3.

Also, in this embodiment, the filter material positioned on the outermost side of the filter body 1 is the filter material 12 made of the woven fabric mesh. In such a case, by the woven fabric mesh 12 positioned on the outermost side of such filter body 1, water contained in the fuel can be separated from the fuel whereby it can be made such that the water does not enter into the filter body 1. Also, even if rubbing occurs between the lower face part of the filter body 1 and the lower part inner wall surface Ta of the fuel tank T accompanying inward and outward movement of the lower part inner wall surface Ta of this fuel tank T due to internal pressure change, and the like, of this fuel tank T (that is, accompanying expansion and contraction of the fuel tank T), it can be made such that the filter material 14 made of an unwoven cloth is not directly affected by it.

Such woven fabric mesh constituting the filter material 12 typically is constituted by thoroughly weaving synthetic fiber such as nylon fiber, polyethylene fiber or polypropylene fiber so as to have a sufficiently fine mesh for oil-water separation. Such woven fabric mesh can be constituted, for example, by Dutch weave, plain weave, twilled weave, satin weave, and the like.

Each filter material 12 to 14 constituting the filter body 1 can be constituted using the same synthetic fiber material. For example, each such layer can be constituted using polypropylene or constituted using nylon. From the standpoint of swelling and repellency relative to gasoline and water, it is said that constituting such each layer by polypropylene is most suitable.

When it is made as such, it is possible to constitute a bag-like filter body 1 with good compatibility by welding together each filter material 12 to 14 overlapped.

The filter body 1 pertaining to the illustrated example can be constituted by folding in two from the state in which the filter materials 12 to 14 are overlapped, so that the filter material 13 formed by spun-bond method is positioned inside, while inserting said space forming member 3, and by subsequently forming a heat seal part (welded place 15) across the edge part excluding the folded edge part, or along the edge part excluding this folded edge part, inside of this edge part, to integrate the one side with the other side being overlapped together by folding in two. The connect-through hole 11 to said cylindrical socket body 2 is punched in advance in the five sheets of filter materials 12 to 14 overlapped, before such folding in two.

Alternatively, the filter body 1 pertaining to the illustrated example can be constituted by laminated a first filter material group made by laminated five sheets of filter materials 12 to 14 and a second filter material group made by laminated five sheets of filter materials 12 to 14, such that the filter material 13 formed by spun-bond method of the first filter material group and the filter material 13 formed by spun-bond method of the second filter material group are made to face each other, and be overlapped so as to sandwich said space forming member 3 therebetween, and by subsequently forming a heat seal part around the outer periphery of the space forming member 3 sandwiched therebetween, to integrate the first filter material group and the second filter material group. The connect-through hole 11 to said cylindrical socket body 2 is punched in advance in the first filter material group or the second filter material group.

Spot welding, furthermore, may be suitably applied to the filter body 1 formed thus in advance of that formation, so as to integrate each filter material 12 to 14 constituting the filter body 1 except said heat seal part.

Also, the unnecessary part located outside of said heat seal part is cut to trim the shape of the filter body 1 if necessary.

Incidentally, the entire contents of the Specification, Claims, Drawings and Abstract of Japanese Patent Application 2007-117566 filed on Apr. 26, 2007 are cited here and are incorporated as a disclosure of the specification of the present invention.

What is claimed is:

1. A fuel filter apparatus, comprising:
   a bag-shape filter body attached to a fuel inlet of a fuel tank so as to connect the fuel inlet and an internal space of the filter body,
   wherein said filter body comprises two or more filters laminated each other and having average aperture diameters different from each other, and
   a range of the aperture diameter constituting an aperture area which accounts for 10% of a total aperture area of a filter A made of an unwoven cloth among the filters, said 10% of the total aperture being accumulated from a largest aperture, and a range of the aperture diameter constituting an aperture area which accounts for 10% of a total aperture area of a filter B made of an unwoven cloth having the largest average aperture diameter next to the filter A, said filter B being disposed outside of the filter A, are approximately overlapped, and
   wherein the range of the aperture diameter constituting an aperture area which accounts for 10% of the total aperture area of the filter B, said 10% of the total aperture being accumulated from a largest aperture, and a range of the aperture diameter constituting an aperture area which accounts for 10% of a total aperture area of a filter C made of an unwoven cloth having a largest average aperture diameter next to the filter B, said filter C being disposed outside of the filter B, are approximately overlapped.

2. A fuel filter apparatus according to claim 1, wherein
   the filter A comprises an unwoven cloth having an average aperture diameter of 30 μm or less, and
   at least one of the filters B and C comprises an unwoven cloth having a largest aperture diameter of 100 μm or more and is disposed outside of the filter A made of the unwoven cloth having the average aperture diameter of 30 μm or less.

3. A fuel filter apparatus according to claim 2, wherein a loss of a pressure of the fuel filter after 200 mg of powder per 1 cm² of the fuel filter is captured from the fuel in which JIS test powder 1 (JIS Z 8901) containing seven kinds of particles is mixed, is 9.8 kPa or less per 1 cm² of the fuel filter when a flow rate of the fuel is 1.6 liters/h per 1 cm² of the fuel filter.

4. A fuel filter apparatus, comprising:

a bag-shape filter body attached to a fuel inlet of a fuel tank so as to connect the fuel inlet and an internal space of the filter body, wherein said filter body comprises two or more filters laminated each other and having average aperture diameters different from each other, within a range of the aperture diameter constituting an aperture area which accounts for 10% of a total aperture area of a filter A made of an unwoven cloth among the filters, said 10% of the total aperture being accumulated from a largest aperture, a largest aperture within a range of an aperture diameter constituting an aperture area which accounts for 10% of the total aperture area of a filter B made of an unwoven cloth having a largest average aperture diameter next to that of the filter A, said 10% of the total aperture area of the filter B being accumulated from a smallest aperture, and the filter B being disposed outside of the filter A, is located, and wherein within the range of the aperture diameter constituting the aperture area which accounts for 10% of the total aperture area of the filter B, said 10% of the total aperture being accumulated from a largest aperture, a largest aperture within a range of an aperture diameter constituting an aperture area which accounts for 10% of the total aperture area of a filter C made of an unwoven cloth and having a larger average diameter next to that of the filter material B, said 10% of the total aperture area of the filter material B being accumulated from a smallest aperture, and the filter C being disposed outside of the filter B, is located.

5. A fuel filter apparatus according to claim 4, wherein:

the filter A comprises an unwoven cloth having an average aperture diameter of 30 μm or less, and at least one of the filters B and C comprises an unwoven cloth having a largest aperture diameter of 100 μm or more and is disposed outside of the filter made of the unwoven cloth having the average aperture diameter of 30 μm or less.

6. A fuel filter apparatus according to claim 5, wherein a loss of a pressure of the fuel filter after 200 mg of powder per 1 cm² of the fuel filter is captured from the fuel in which JIS test powder 1 (JIS Z 8901) containing seven kinds of particles is mixed, is 9.8 kPa or less per 1 cm² of the fuel filter when a flow rate of the fuel is 1.6 liters/h per 1 cm² of the fuel filter.

* * * * *